E. DUKE.
BEET DIGGING AND TOPPING MACHINE.
APPLICATION FILED SEPT. 24, 1917. RENEWED APR. 17, 1919.
1,306,586.
Patented June 10, 1919.
4 SHEETS—SHEET 4.
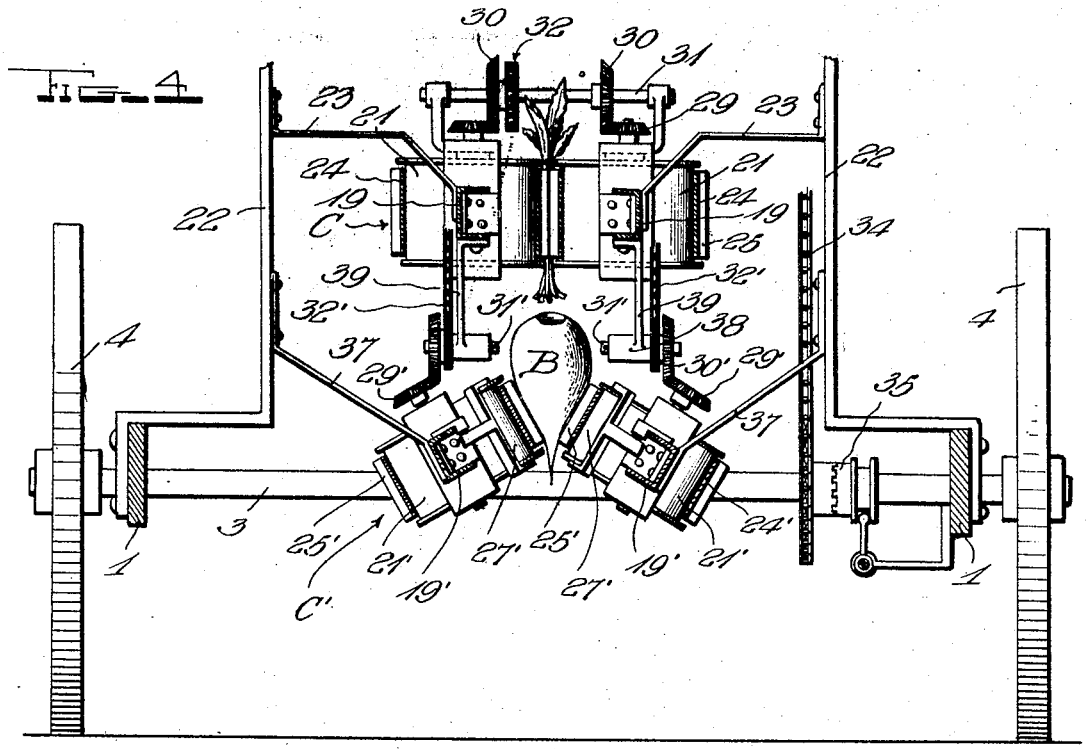
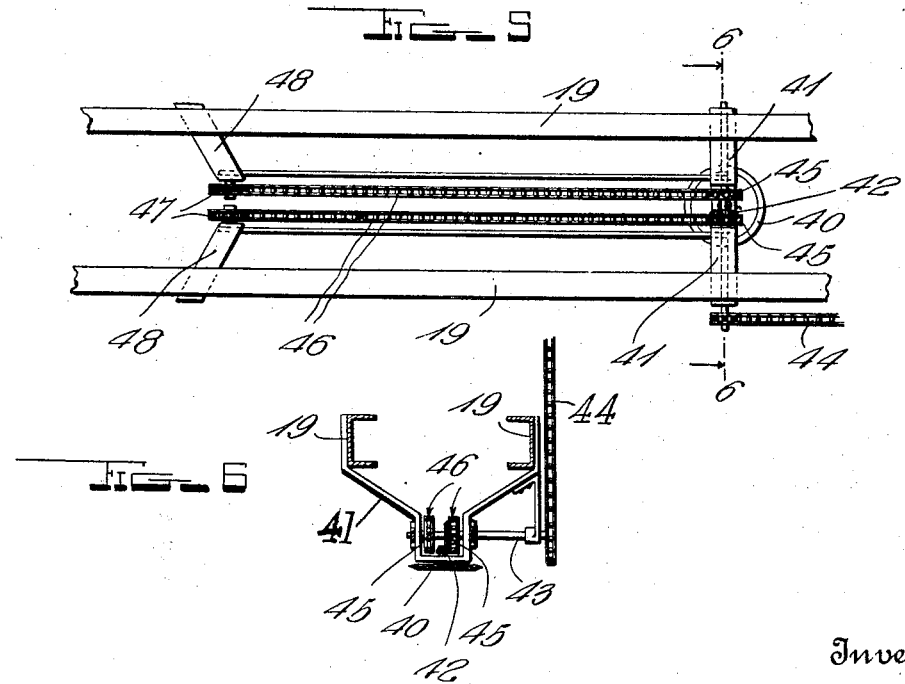
Inventor
Edgar Duke
Witness

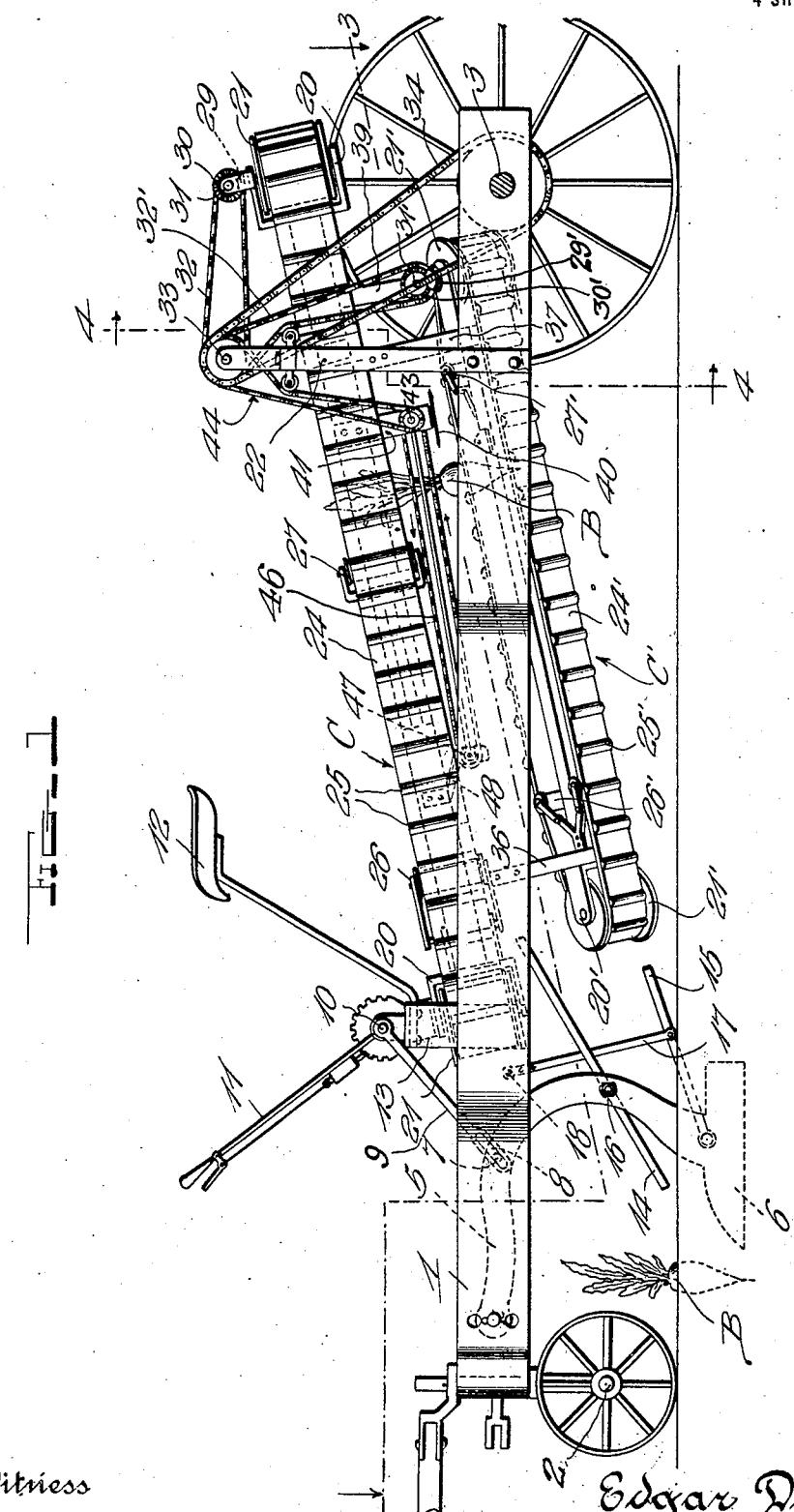

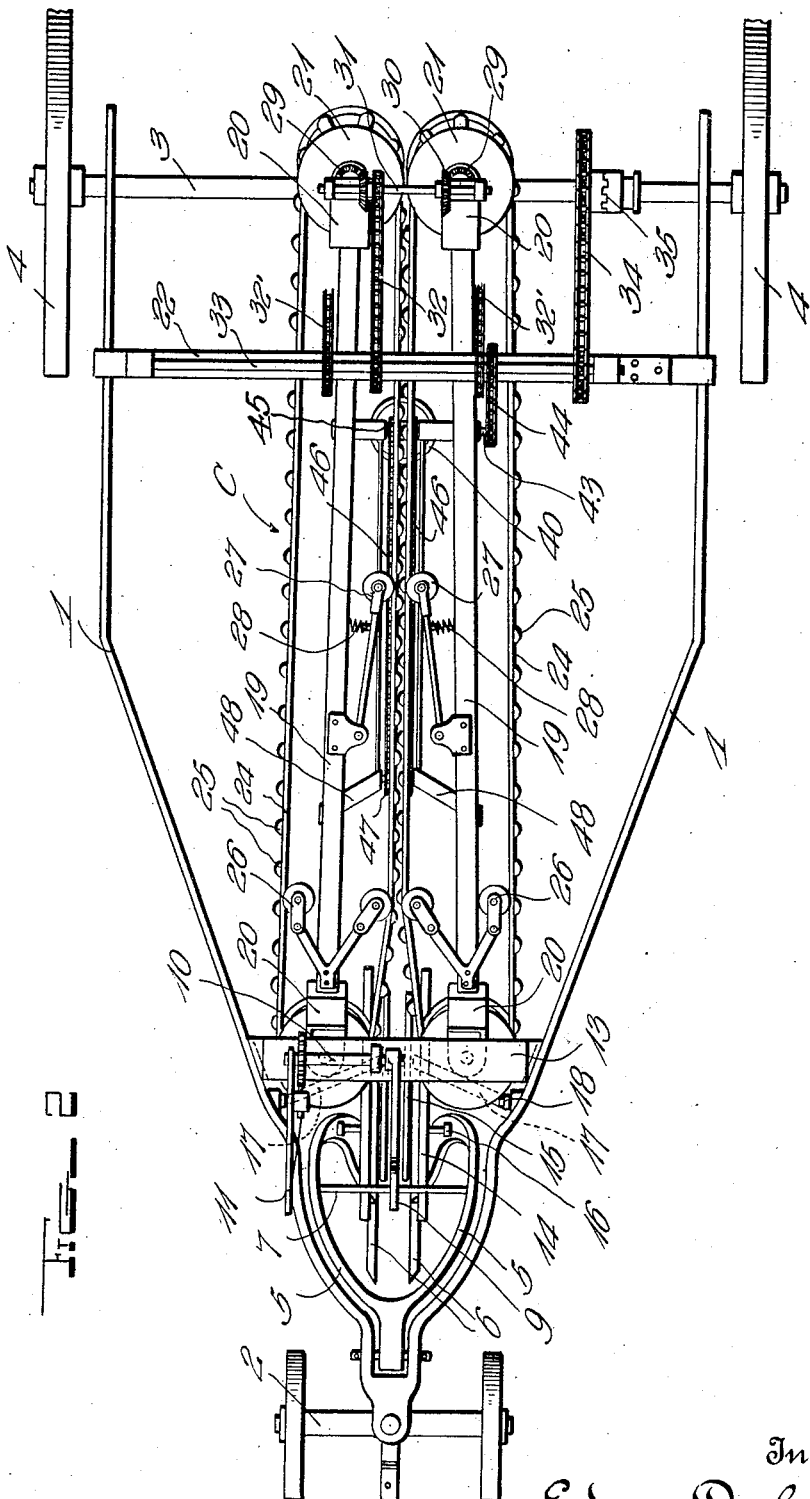

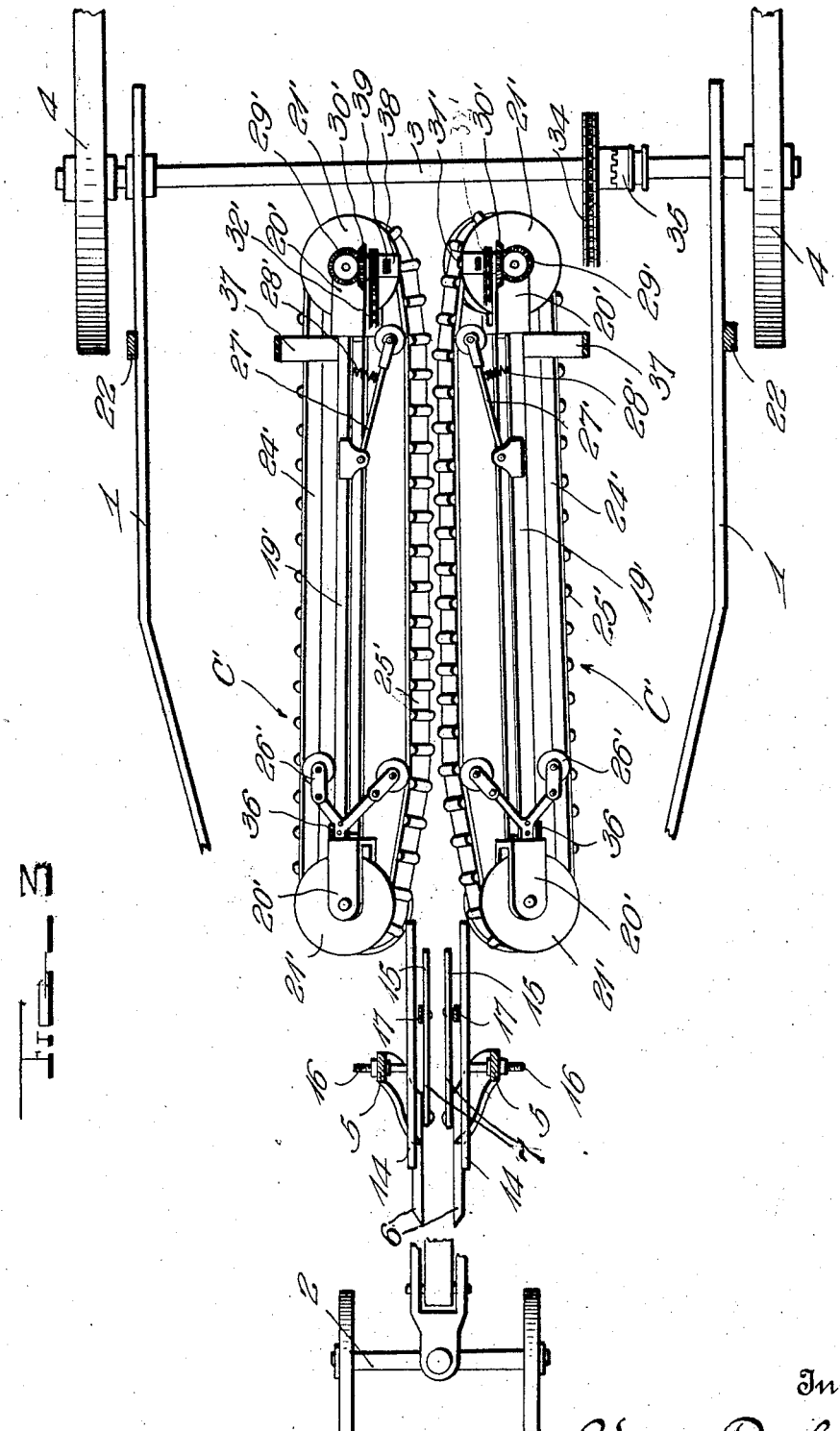

UNITED STATES PATENT OFFICE.

EDGAR DUKE, OF ASHTON, IDAHO.

BEET DIGGING AND TOPPING MACHINE.

1,306,586.  Specification of Letters Patent.  Patented June 10, 1919.

Application filed September 24, 1917, Serial No. 193,006. Renewed April 17, 1919. Serial No. 290,899.

*To all whom it may concern:*

Be it known that I, EDGAR DUKE, a citizen of the United States, residing at Ashton, in the county of Fremont and State of Idaho, have invented certain new and useful Improvements in Beet Digging and Topping Machines; and I do declare the following to be a full, clear, and exact description of the invention, such as will enable others skilled in the art to which it appertains to make and use the same.

My invention relates to improvements in beet harvesting machines and more particularly to a novel arrangement of parts for topping the beets after they have been removed from the earth, the principal object being to provide a simple and inexpensive, yet a highly efficient and durable arrangement of parts for conveying the beets rearwardly and properly positioning them for the topping operation.

With the foregoing general object in view, the invention resides in certain novel features of construction and unique combinations of parts to be hereinafter fully described and claimed, the descriptive matter being supplemented by the accompanying drawings which form a part of this specification and in which:—

Figure 1 is a side elevation of the improved beet harvesting machine;

Fig. 2 is a top plan view with the lower beet conveying belts omitted for the sake of clearness;

Fig. 3 is a horizontal section taken substantially on the planes indicated by the line 3—3 of Fig. 1, showing more particularly the lower conveying belts;

Fig. 4 is a vertical transverse section on the planes indicated by the line 4—4 of Fig. 1;

Fig. 5 is a top plan view of the endless belts which properly position the beets for the topping operation; and, Fig. 6 is a vertical transverse section of Fig. 5 on the plane of the line 6—6 thereof.

In the drawings above briefly described, the numeral 1 designates a suitably constructed main frame which is mounted upon front and rear wheel supported axles 2 and 3, the latter being driven by its wheels 4, so that power may be taken from this axle for driving the entire machine.

The front end of the frame 1 is preferably brought to substantially a point as will be clear from Fig. 2, and it is within this end of the frame that the front ends of a pair of suitable plow beams 5 are pivotally mounted for vertical swinging, the rear ends of said beams being provided with suitable plows or shoes 6 which are adapted to raise the beets B from the earth. A rod 7 preferably extends between the beams 5 and is received in a slot 8 in the front end of an arm 9 which extends forwardly from a transverse rock shaft 10, said shaft having a suitable hand lever 11 adjacent the driver's seat 12, whereby actuation of said lever will raise and lower the plows as occasion may demand. It will be observed by reference more particularly to Figs. 1 and 2, that both the rock shaft 10 and the seat 12 are mounted on a transverse arched frame 13 whose ends are rigidly secured to the side bars of the frame 1. This arched frame also serves to support the front end of an upper conveyer C and the front end of a lower conveyer C' is in turn suspended from the front end of the conveyer C.

The upper conveyer C is adapted to handle the beet tops, whereas the lower conveyer C' grips the bodies of the beets, and in order that the bodies and tops may be effectively guided to their respective conveyers, upper and lower guide bars 14 and 15 are preferably carried pivotally by the plow beams, said bars leading respectively to the conveyers C and C'. For adjusting the bars 14 as occasion may demand, said bars are pivoted to the plow beams and provided with suitable devices 16 whereby they may be clamped in adjusted position. A different adjusting means will in most cases be employed for the bars 15, this means preferably consisting of a pair of vertical links 17 having any suitable adjustable connections 18 with the frame 1.

By the adjustments just described for the bars 14 and 15, it will be obvious that they may be properly set for effectively guiding the beets and the tops into the conveyers C' and C respectively, regardless of the height to which the plows 6 may be adjusted by the lever 11.

The conveyer C above mentioned, includes a pair of upwardly and rearwardly inclining bars 19 which preferably diverge a slight amount forwardly, the front and rear ends of said bars having forks 20 in which substantially vertical rollers 21 are rotatably mounted. The front forks 20 are secured in any preferred manner to the arched frame 13 so that the front ends of the bars 19 will be supported at the required elevation, whereas the rear ends of these bars are secured to a second transverse arched frame 22 by means of suitable arms or the like 23 shown more particularly in Fig. 4. A pair of endless belts 24 are trained around the front and rear rollers 21 with their inner reaches disposed in substantially parallel relation with the exception of their forward portions, which portions diverge forwardly in order to effectively guide the beet tops therebetween. The outer surfaces of both belts 24 are provided with transverse ribs 25 to grip the beet tops, and in order that said device may be held in proper relation, and at the requisite tension, suitable tighteners 26 are provided adjacent the front ends of the bars 19, whereas other tighteners 27 are employed adjacent the intermediate portions of said bars. The tighteners 26 may be of any preferred formation and may be adjusted as occasion may demand, but in most cases the tighteners 27 will be forced to operative position by coiled springs 28 as shown clearly in Fig. 2.

For driving the rear rollers 21 to operate the belts 24, said rollers are equipped with bevel gears 29 meshing with similar gears 30 on a transverse shaft 31, said shaft being connected by a sprocket chain 32 with a transverse shaft 33 which is rotatably mounted upon the frame 22, said last named shaft being driven by a sprocket chain 34 from the rear axle 3, a suitable clutch 35 being provided in order that the machine may be thrown out of gear whenever required.

The lower conveyer C' includes a pair of longitudinal bars 19' having forks 20' at their front and rear ends in which rollers 21' are rotatably mounted, both the front and rear sets of rollers converging downwardly so that the innermost reaches of the belts 24' which pass around said rollers, will similarly converge so that a trough-like conveyer is provided for the bodies of the beets. Both belts 24' are slatted or ribbed as shown at 25' and tighteners 26' and 27' are provided for the same purposes as the tighteners 26 and 27 above described. It will be observed that due to the springs 28' of the tighteners 27' the inner reaches of the two belts 24' will be permitted to spread or yield outwardly as the beets are forced downwardly by means yet to be described in order that they may be properly positioned for the cutting or topping operation.

The bars 19' may be supported in any suitable manner, but hangers 36 and 37 preferably depend respectively from the bars 19, and frame 22 for this purpose as shown clearly in Figs. 1 and 4.

Any preferred means could well be employed for driving the belts 24' but the rear rollers 21' thereof are by preference provided with beveled gears 29' meshing with similar gears 30' on short transverse shafts 31' which are driven from the shaft 33 by means of sprocket chains 32'. The bearings 38 of the transverse shafts 31' are preferably carried on hangers 39 which depend from the side bars 19 of the upper conveyer C, but it will be obvious that any other preferred means could well be utilized for supporting these bearings. Beneath the rear portions of the bars 19, is a rotary topping knife 40, said knife being carried by a U-shaped hanger 41 whose upper ends are secured to said bars. By means of intermeshing bevel gears or the like 42, the knife 40 is driven from a transverse shaft 43 which is rotatably supported by the hanger 41 and driven by a sprocket chain or the like 44 from the shaft 33. The shaft 43 also carries sprockets 45 around which a pair of beet positioning chains or belts 46 are trained, the front portions of said chains being passed around other sprockets 47 which are supported by hangers 48 depending from the bars 19 as illustrated clearly in Figs. 1 and 5. It is the office of the chains 46 to force the beets B downwardly between the inner reaches of the belts 24' so that the upper ends of said beets will be properly positioned in respect to the topper 40, thus insuring that only the required amount of the beets proper shall be removed with the top or leaves. In operating in this manner, it is essential that the lower reaches of the chains 46 shall converge with the belts 24', toward the cutter 20 as illustrated clearly in Fig. 1. By this arrangement, the beets will gradually be depressed as they are moved rearwardly and it will be obvious that the tighteners 27' will allow the inner reaches of the conveyers 24' to spread as this action takes place. During the conveying of the beets, it is worthy of note that there will be no tilting whatever thereof since the belts 24, 24' and 46 are all driven at the same speed.

In operation, the plows 6 are lowered to operative position and the guiding bars 14 and 15 are properly adjusted. The clutch 35 is now thrown in and when the entire machine is pulled forwardly, the main drive chain 34 and the several branch drives will move the inner reaches of the belts 24 and 24' rearwardly and will at the same time so move the lower reaches of the chains 46, the cutter 40 being rotated rapidly while the several parts are moving as set forth. The beets are raised from the earth by the plows 6 and the tops and bodies thereof are guided respectively between the belts of the upper and lower conveyers C and C' respectively, said conveyers gripping the beets and carrying them rearwardly until the belts or chains 46 engage the tops of the beet bodies as indicated in Fig. 1. Due to the convergence of the chains 46 in respect to the belt 24', the beets will be forced downwardly as they are carried rearwardly and thus they are properly presented to the topping knife 40, so that the beet tops will be severed from the bodies thereof at a uniform distance below the extreme lower end of the top. The severed tops are released at the rear end of the conveyer C, whereas the beets are dropped from the rear end of the conveyer C', and it is highly possible that suitable receptacles or conveyers may well be employed for receiving the tops and bodies. However, since the use of such devices is well known, they need not be here illustrated or described in detail.

From the foregoing, taken in connection with the accompanying drawings, it will be obvious that although my invention is of comparatively simple and inexpensive construction, it will be highly efficient and durable. For these reasons, the several features of construction shown and described, constitute the preferred form of the machine. I wish it understood, however, that within the scope of the invention as claimed, numerous minor changes may well be made.

I claim:

1. In a beet topping machine, the combination of a pair of endless belts having outwardly yieldable inner reaches moving in the same direction to grip and convey the beets, topping means above said reaches of the belts, and a pair of beet positioning belts converging with said first named belts toward said topping means and adapted to overlie the beet bodies to force the same downwardly and properly position them in respect to said topping means as they are conveyed rearwardly.

2. In a beet topping machine, the combination of a pair of upper belts having inner reaches moving in the same direction, and adapted to grip and convey the beet tops therebetween, topping means below said upper belts, a pair of lower belts below said topping means and having outwardly yieldable inner reaches movable in the same direction to grip and convey the beets, and a pair of beet positioning belts converging with said lower belts toward said topping means and adapted to overlie the beet bodies to force the same downwardly for properly positioning them in respect to said topping means as they are conveyed rearwardly.

3. In a beet topping machine, the combination of a pair of flat belts having outwardly yieldable inner reaches moving in the same direction to grip and convey the beets, said reaches converging downwardly in transverse section to form a trough-like conveyer for the beets, topping means above said reaches, and means above and converging rearwardly with said belts for forcing the beets downwardly to properly position their upper ends in respect to said topping means as they are conveyed rearwardly.

4. In a beet topping machine, the combination of a pair of flat belts having outwardly yieldable inner reaches moving in the same direction to grip and convey the beets, said reaches converging downwardly in transverse section to form a trough-like conveyer for the beets, topping means above said reaches, and a pair of beet positioning belts having reaches moving in the same direction and converging with said first named reaches toward said topping means, said reaches of said beet positioning belts being adapted to overlie the beet bodies to force them downwardly for proper presentation to said topping means.

5. In a beet topping machine, the combination of beet topping means, means for conveying the beets to said topping means, and a pair of driven belts adapted to overlie the beet bodies to position them properly for presentation to said topping means, said belts converging with said conveying means toward said topping means.

6. In a beet harvesting machine, the combination of a main portable frame having beet digging means, front and rear transverse frame members carried by said main frame, a pair of upper longitudinal bars inclining downwardly and forwardly and supported by said frame members, a lower pair of similar bars below said first named bars, rollers on the front and rear ends of all of said bars, the axes of the front and rear rollers of the lower bars converging downwardly, upper and lower pairs of endless belts trained around the upper and lower rollers and forming conveyers for the beet tops and the beet bodies respectively, means for guiding said bodies and tops from the beet digging means into said conveyers, and beet topping means to which the beets are presented by said conveyers.

In testimony whereof I have hereunto set my hand in the presence of two subscribing witnesses.

EDGAR DUKE.

Witnesses:
ALLEN B. SAMSEL,
ARTHUR H. WILKIE.